US008804284B1

(12) United States Patent
Ohtake et al.

(10) Patent No.: US 8,804,284 B1
(45) Date of Patent: Aug. 12, 2014

(54) RECORDING HEAD WITH JUNCTIONS BETWEEN POLES AND DISK DRIVE WITH THE SAME

(71) Applicant: Kabushiki Kaisha Toshiba, Tokyo (JP)

(72) Inventors: Masaya Ohtake, Fujisawa (JP); Tomoko Taguchi, Kunitachi (JP); Takuya Matsumoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/012,472

(22) Filed: Aug. 28, 2013

(30) Foreign Application Priority Data

Apr. 5, 2013 (JP) ................................. 2013-079718

(51) Int. Cl.
*G11B 5/127* (2006.01)
*G11B 5/187* (2006.01)

(52) U.S. Cl.
USPC ........................................................ 360/125.3

(58) Field of Classification Search
USPC ........ 360/128, 125.71, 125.3, 123.11, 123.12
See application file for complete search history.

(56) References Cited

U.S. PATENT DOCUMENTS

| | | | | |
|---|---|---|---|---|
| 7,616,412 B2* | 11/2009 | Zhu et al. | .................... | 360/324.2 |
| 7,982,996 B2* | 7/2011 | Smith et al. | ....................... | 360/59 |
| 8,164,861 B2* | 4/2012 | Braganca et al. | ............. | 360/313 |
| 8,320,080 B1* | 11/2012 | Braganca et al. | ............. | 360/128 |
| 8,446,691 B2* | 5/2013 | Takagishi et al. | .......... | 360/125.3 |
| 8,462,461 B2* | 6/2013 | Braganca et al. | .......... | 360/125.3 |
| 8,553,362 B2* | 10/2013 | Tanabe et al. | ............. | 360/125.3 |
| 2008/0231994 A1 | 9/2008 | Kimura et al. | | |
| 2010/0073806 A1* | 3/2010 | Koui et al. | ....................... | 360/75 |
| 2012/0134046 A1* | 5/2012 | Matsumoto et al. | ........ | 360/99.08 |
| 2012/0162823 A1* | 6/2012 | Ikai et al. | .................... | 360/234.3 |
| 2012/0262820 A1* | 10/2012 | Matsumoto et al. | ........ | 360/99.08 |
| 2012/0262821 A1* | 10/2012 | Taguchi et al. | ............. | 360/99.08 |
| 2013/0016441 A1 | 1/2013 | Taguchi et al. | | |
| 2013/0065086 A1* | 3/2013 | Kudo et al. | .................... | 428/815 |
| 2013/0148242 A1* | 6/2013 | Koui et al. | ............... | 360/125.12 |
| 2013/0215532 A1* | 8/2013 | Taguchi et al. | ........... | 360/123.02 |
| 2013/0314818 A1* | 11/2013 | Maatsumoto et al. | ..... | 360/99.08 |
| 2014/0002924 A1* | 1/2014 | Yamada et al. | ............. | 360/99.08 |

FOREIGN PATENT DOCUMENTS

| | | |
|---|---|---|
| JP | H01-256011 | 10/1989 |
| JP | 2008-234777 | 10/2008 |
| JP | 2009-048719 | 3/2009 |
| JP | 2010-003367 | 1/2010 |
| JP | 2012-226793 | 11/2012 |
| JP | 2013-025824 | 2/2013 |

* cited by examiner

*Primary Examiner* — Brian Miller
(74) *Attorney, Agent, or Firm* — Knobbe Martens Olson & Bear LLP

(57) ABSTRACT

According to one embodiment, a magnetic recording head includes a disk-facing surface, a main pole, a trailing shield, a first junction which connects the trailing shield and the main pole in a position off the disk-facing surface, a second junction which includes a high-frequency oscillator and connects the trailing shield and the main pole on side of the disk-facing surface, a leading shield on the leading side of the main pole, including a junction connected to the main pole in a position off the disk-facing surface with a third junction therebetween, and a connecting terminal configured to pass a current in series through the main pole, the nonmagnetic conductive layer, and the trailing shield. A thickness of the third junction is smaller than that of the first junction.

14 Claims, 8 Drawing Sheets

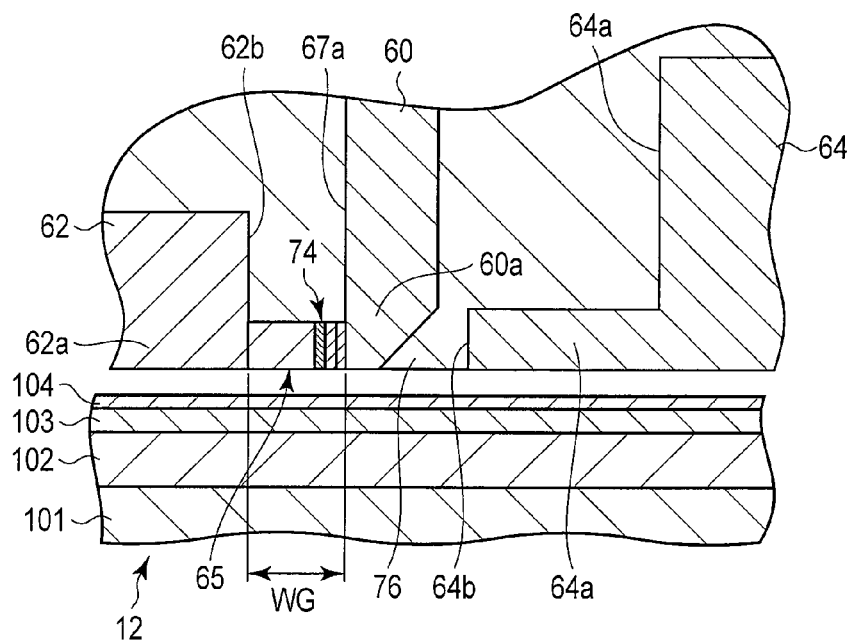
F I G. 5
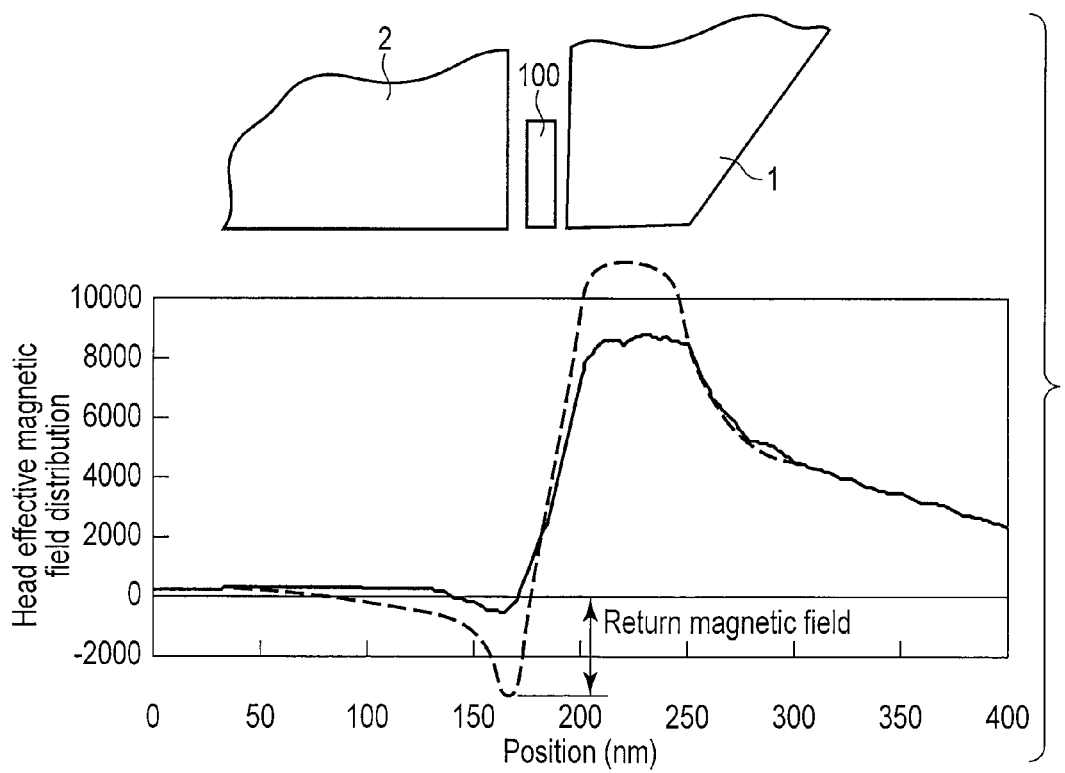
F I G. 6

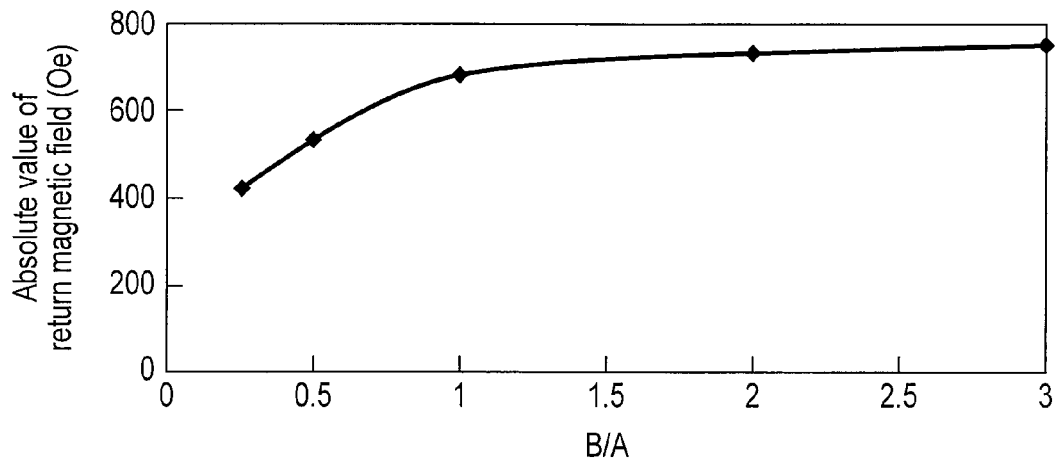
F I G. 7
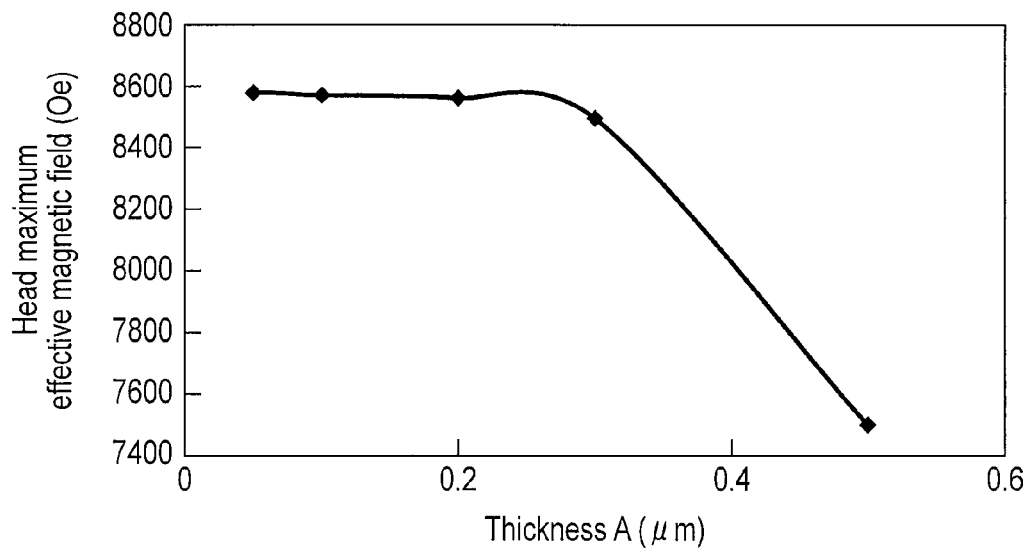
F I G. 8

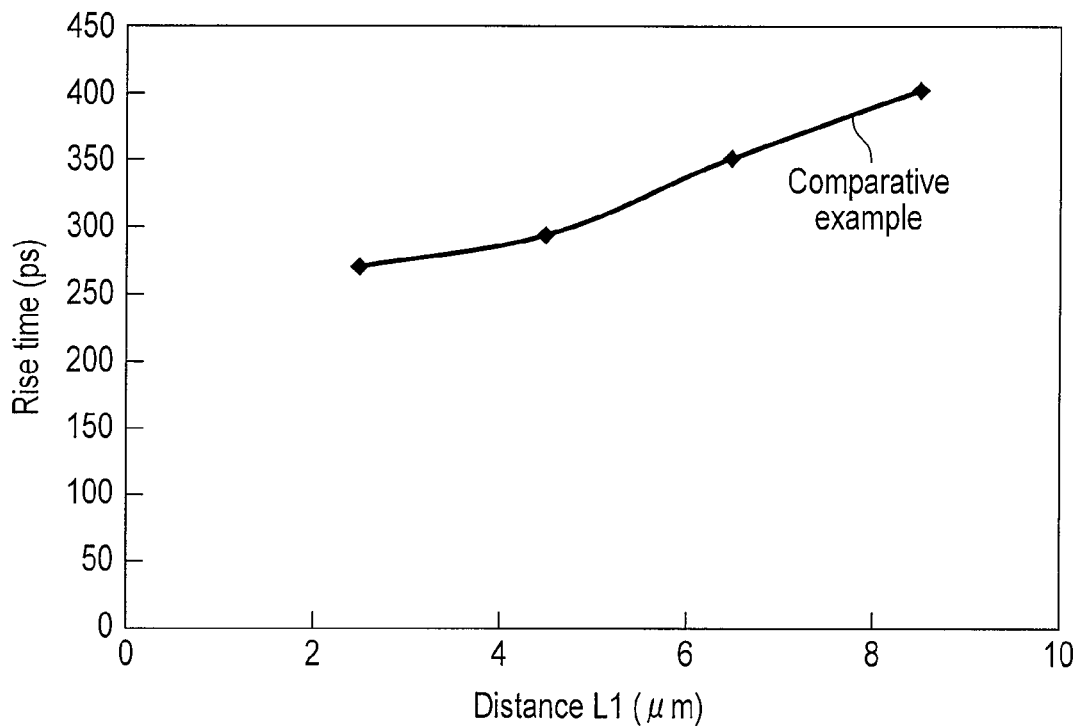
F I G. 10
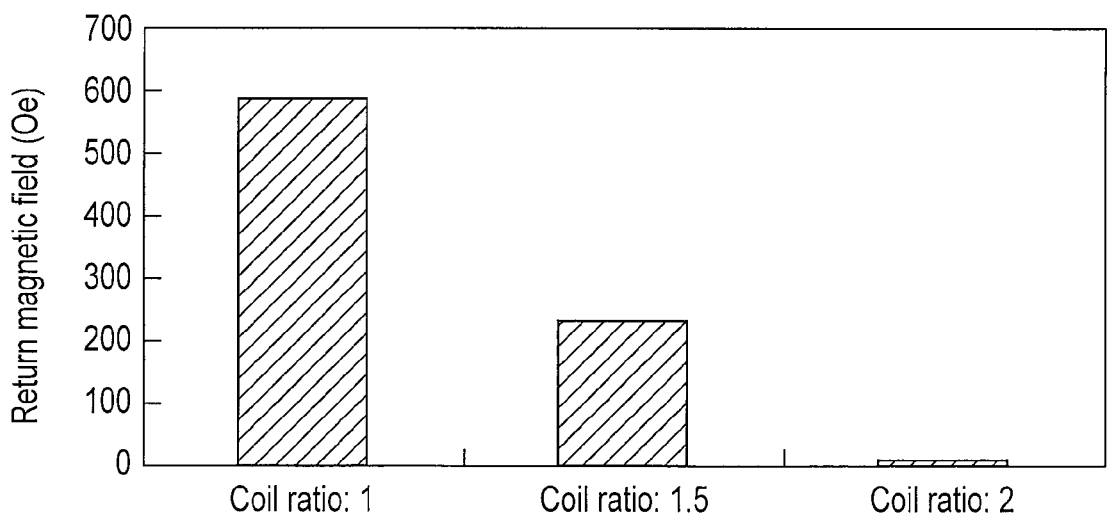
F I G. 11

RECORDING HEAD WITH JUNCTIONS BETWEEN POLES AND DISK DRIVE WITH THE SAME

CROSS-REFERENCE TO RELATED APPLICATIONS

This application is based upon and claims the benefit of priority from Japanese Patent Application No. 2013-079718, filed Apr. 5, 2013, the entire contents of which are incorporated herein by reference.

FIELD

Embodiments described herein relate generally to a magnetic recording head used in a disk drive and the disk drive provided with the same.

BACKGROUND

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, trailing shield, leading shield, and coil. The trailing shield is located on the trailing side of the main pole with a write gap therebetween and configured to close a magnetic path that leads to a magnetic disk. The leading shield is located on the leading side of the main pole. The coil serves to pass magnetic flux through the main pole. Further, a high-frequency assisted head is proposed in which a high-frequency oscillator is provided between the main pole and a medium-side end portion of the trailing shield and an electric current is applied to the high-frequency oscillator through the main pole and trailing shield.

According to the magnetic recording head described above, an effective recording magnetic field of the head is enhanced as the high-frequency oscillator is oscillated, whereby the magnetization reversal of a recording layer of a recording medium is improved. When the head is used for high-bandwidth transfer, however, there is a problem that a magnetic field response in a magnetic core cannot be satisfactorily followed, so that the error rate is degraded.

BRIEF DESCRIPTION OF THE DRAWINGS

FIG. 5 is an enlarged sectional view showing a disk-side end portion of the recording head;

FIG. 6 is a diagram showing a distribution of an effective head magnetic field in a traveling direction of a recording head according to a comparative example;

FIG. 7 is a diagram showing the absolute value of a return magnetic field obtained when the ratio (B/A) between respective thicknesses A and B of first and third junctions is changed, in the recording head according to the embodiment;

FIG. 8 is a diagram showing the relationship between thickness A and the maximum effective magnetic field of the recording head according to the embodiment;

FIG. 10 is a diagram showing the change of the rise time obtained when distance L1 from an ABS to a first junction is changed, in the recording head according to the embodiment;

FIG. 11 is a diagram showing the magnitude of the return magnetic field obtained when the ratio between the numbers of turns of first and second coils is changed, in the recording head according to the embodiment;

DETAILED DESCRIPTION

Various embodiments will be described hereinafter with reference to the accompanying drawings. In general, according to one embodiment, a magnetic recording head comprises a disk-facing surface configured to face a recording medium; a main pole configured to produce a recording magnetic field perpendicular to a recording layer of the recording medium; a trailing shield which is located on the trailing side of the main pole with a write gap therebetween and forms a first magnetic core in cooperation with the main pole; a first junction of a nonmagnetic material which connects the trailing shield and the main pole in a position off the disk-facing surface; a second junction which comprises a nonmagnetic conductive layer comprising a high-frequency oscillator and connects the trailing shield and an end portion of the main pole on side of the disk-facing surface; a first coil wound around the first magnetic core; a leading shield which is located on the leading side of the main pole, comprises a distal end portion opposed to the end portion of the main pole on side of the disk-facing surface with a nonmagnetic material therebetween and a junction connected to the main pole in a position off the disk-facing surface with a third junction of a magnetic material therebetween, and forms a second magnetic core in cooperation with the main pole; a second coil wound around the second magnetic core; and a connecting terminal configured to pass a current in series through the main pole, the nonmagnetic conductive layer, and the trailing shield. A thickness of the third junction in a direction parallel to the disk-facing surface is smaller than that of the first junction in the same direction.

Figure 1:
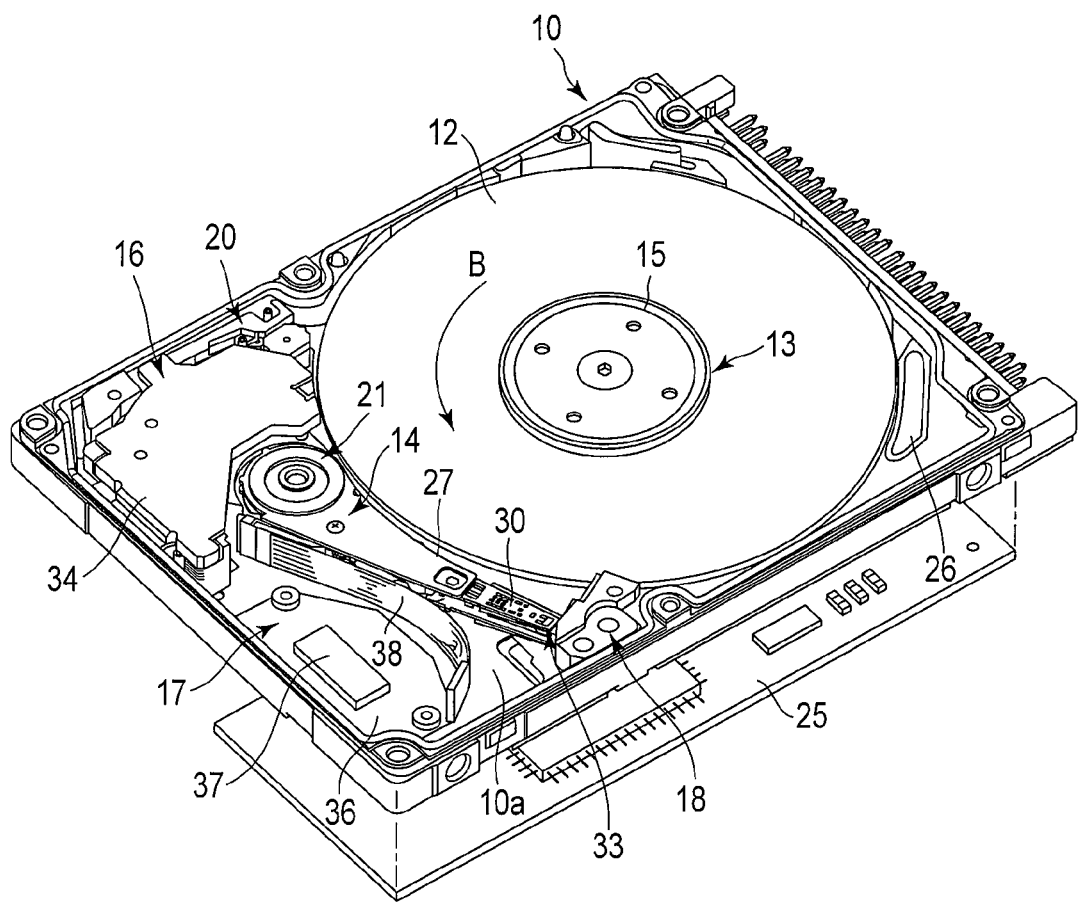
FIG. 1 is a perspective view showing a hard disk drive (HDD) according to an embodiment.
Figure 2:
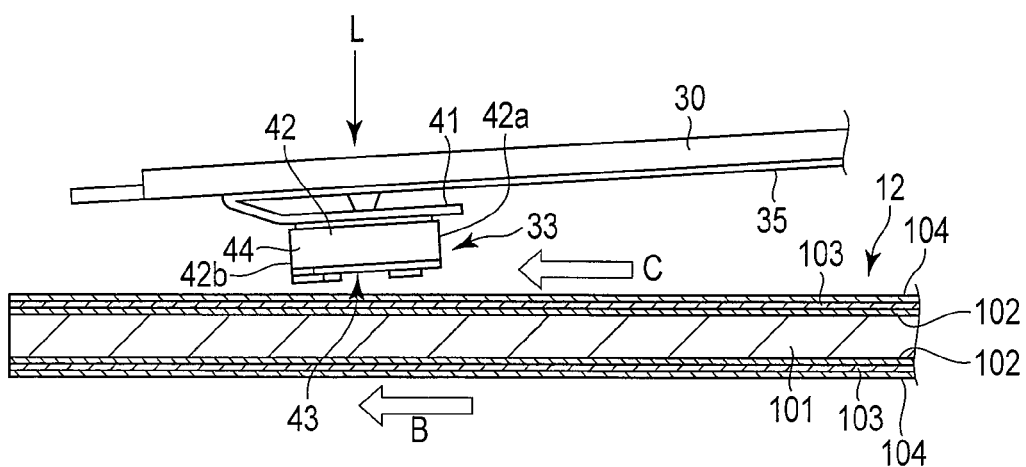
FIG. 2 is a side view showing a magnetic head and suspension of the HDD.

FIG. 1 shows the internal structure of an HDD as a magnetic disk drive according to an embodiment with its top cover removed, and FIG. 2 shows a flying magnetic head. As shown in FIG. 1, the HDD comprises a housing 10. The housing 10 comprises a base 10a in the form of an open-topped rectangular box and the top cover (not shown) in the form of a rectangular plate. The top cover is attached to the base 10a by screws so as to close the top opening of the base. Thus, the housing 10 is kept airtight inside and can communicate with the outside through a breathing filter 26 only.

The base 10a carries thereon a magnetic disk 12, for use as a recording medium, and a drive unit. The drive unit comprises a spindle motor 13, a plurality (for example, two) of magnetic heads 33, head actuator 14, and voice coil motor (VCM) 16. The spindle motor 13 supports and rotates the magnetic disk 12. The magnetic heads 33 record and reproduce data in and from the disk. The head actuator 14 supports the magnetic heads 33 for movement relative to the surface of the magnetic disk 12. The VCM 16 pivots and positions the head actuator. The base 10a further carries a ramp loading mechanism 18, latch mechanism 20, and board unit 17. The ramp loading mechanism 18 holds the magnetic heads 33 in positions off the magnetic disk 12 when the magnetic heads 33 are moved to the outermost periphery of the disk. The latch mechanism 20 holds the head actuator 14 in a retracted position if the HDD is jolted, for example. Electronic components, such as a preamplifier, head IC, etc., are mounted on the board unit 17.

A printed circuit board 25 is attached to the outer surface of the base 10a by screws so as to face the bottom wall of the base. The circuit board 25 controls the operations of the spindle motor 13, VCM 16, and magnetic heads 33 through the board unit 17.

As shown in FIG. 1, the magnetic disk 12 is coaxially fitted on the hub of the spindle motor 13 and clamped and secured to the hub by a clamp spring 15, which is attached to the upper end of the hub by screws. The magnetic disk 12 is rotated at a predetermined speed in the direction of arrow B by the spindle motor 13 for use as a drive motor.

The head actuator 14 comprises a bearing 21 secured to the bottom wall of the base 10a and a plurality of arms 27 extending from the bearing. The arms 27 are arranged parallel to the surfaces of the magnetic disk 12 and at predetermined intervals and extend in the same direction from the bearing 21. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each suspension 30 may be formed integrally with its corresponding arm 27. Each magnetic head 33 is supported on an extended end of its corresponding suspension 30. The arms 27 and suspensions 30 constitute a head suspension, and the head suspension and magnetic heads 33 constitute a head suspension assembly.

As shown in FIG. 2, each magnetic head 33 comprises a substantially cuboid slider 42 and read/write head section 44 on an outflow end (trailing end) of the slider. Each magnetic head 33 is secured to a gimbal spring 41 on the distal end portion of its corresponding suspension 30. Head load L directed to the surface of the magnetic disk 12 is applied to each head 33 by the elasticity of the suspension 30. The two arms 27 are arranged parallel to and spaced apart from each other, and the suspensions 30 and magnetic heads 33 mounted on these arms face one another with the magnetic disk 12 between them.

Each magnetic head 33 is electrically connected to a main flexible printed circuit board (main FPC, described later) 38 through the suspension 30 and a relay FPC 35 on the arm 27.

As shown in FIG. 1, the board unit 17 comprises an FPC main body 36 formed of a flexible printed circuit board and the main FPC 38 extending from the FPC main body. The FPC main body 36 is secured to the bottom surface of the base 10a. The electronic components, including a preamplifier 37 and head IC, are mounted on the FPC main body 36. An extended end of the main FPC 38 is connected to the head actuator 14 and also connected to each magnetic head 33 through each relay FPC 35.

The VCM 16 comprises a support frame (not shown) extending from the bearing 21 in the direction opposite to the arms 27 and a voice coil supported on the support frame. When the head actuator 14 is assembled to the base 10a, the voice coil is located between a pair of yokes 34 that are secured to the base 10a. Thus, the voice coil, along with the yokes and a magnet secured to one of the yokes, constitutes the VCM 16.

If the voice coil of the VCM 16 is energized with the magnetic disk 12 rotating, the head actuator 14 pivots, whereupon each magnetic head 33 is moved to and positioned above a desired track of the magnetic disk 12. As this is done, the head 33 is moved radially relative to the magnetic disk 12 between the inner and outer peripheral edges of the disk.

Figure 3:
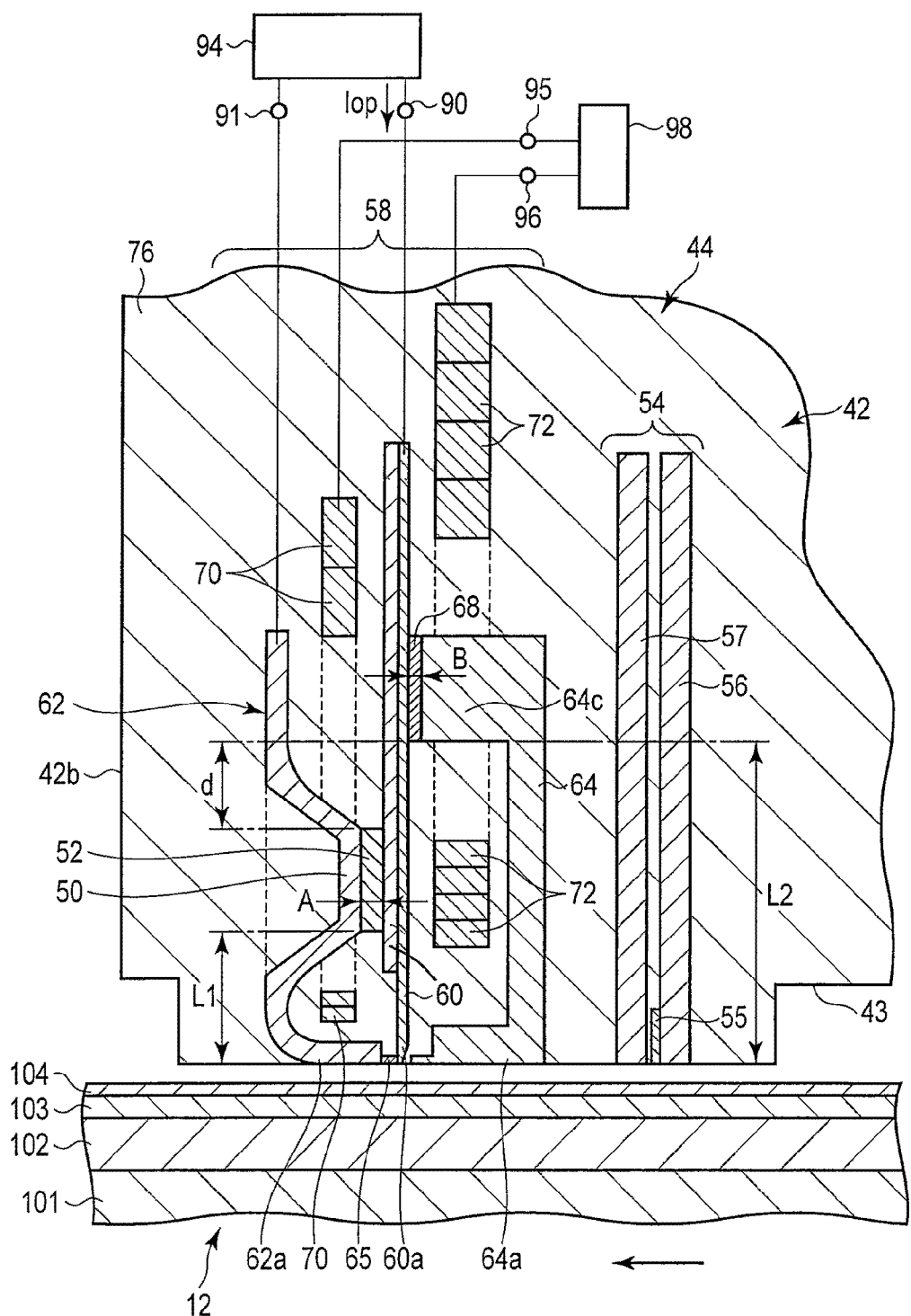
FIG. 3 is an enlarged sectional view showing a head section of the magnetic head.

The following is a detailed description of configurations of the magnetic disk 12 and each magnetic head 33. FIG. 3 is an enlarged sectional view showing the magnetic disk and the head section 44 of the magnetic head 33.

As shown in FIGS. 1 to 3, the magnetic disk 12 comprises a substrate 101 formed of a nonmagnetic disk with a diameter of, for example, about 2.5 inches (6.35 cm). As shown in FIGS. 2, 3 and 5, a soft magnetic layer 102 for use as an underlayer is formed on each surface of the substrate 101. The soft magnetic layer 102 is overlain by a magnetic recording layer 103, which has a magnetic anisotropy perpendicular to the disk surface. Further, a protective film 104 is formed on the recording layer 103.

As shown in FIGS. 2 and 3, each magnetic head 33 is constructed as a flying head, which comprises the substantially cuboid slider 42 and head section 44 formed on the outflow or trailing end side of the slider. The slider 42 is formed of, for example, a sintered body (AlTic) containing alumina and titanium carbide, and the head section 44 is formed by laminating thin films.

The slider 42 has a rectangular disk-facing surface or air-bearing surface (ABS) 43 configured to face a surface of the magnetic disk 12. The slider 42 is kept floating by airflow C that is produced between the disk surface and the ABS 43 as the magnetic disk 12 rotates. The direction of airflow C is coincident with the direction of rotation B of the magnetic disk 12. The slider 42 is located on the surface of the magnetic disk 12 in such a manner that the longitudinal direction of the ABS 43 is substantially coincident with the direction of airflow C.

The slider 42 comprises leading and trailing ends 42a and 42b on the inflow and outflow sides, respectively, of airflow C. The ABS 43 of the slider 42 is formed with leading and trailing steps, side steps, negative-pressure cavity, etc., which are not shown.

As shown in FIG. 3, the head section 44 is formed as a dual-element magnetic head, comprising a reproduction head 54 and recording head (magnetic recording head) 58 formed on the trailing end 42b of the slider 42 by thin-film processing.

The reproduction head 54 comprises a magnetic film 55 having a magnetoresistive effect and shielding films 56 and 57 disposed on the trailing and leading sides, respectively, of the magnetic film such that they sandwich the magnetic film between them. The respective lower ends of the magnetic film 55 and shielding films 56 and 57 are exposed in the ABS 43 of the slider 42.

Figure 4:
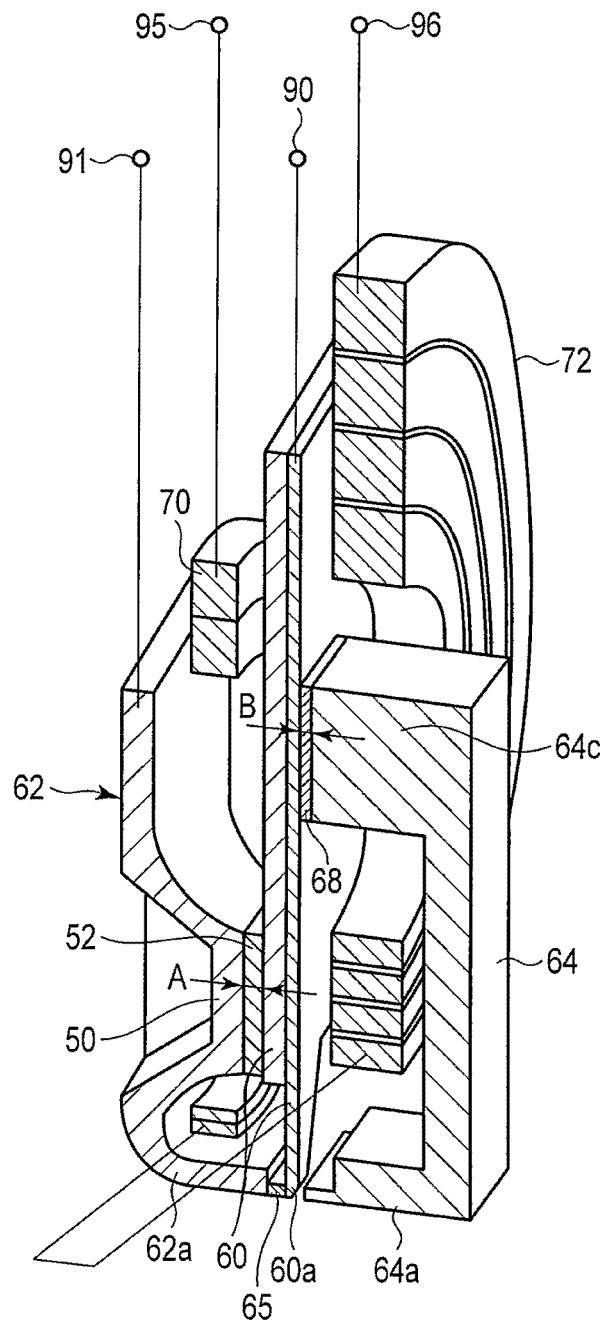
FIG. 4 is a perspective view schematically showing a recording head of the magnetic head.

The recording head 58 is located nearer to the trailing end 42b of the slider 42 than the reproduction head 54. FIG. 4 is a perspective view schematically showing the recording head 58, and FIG. 5 is an enlarged sectional view showing a disk-side end portion of the recording head 58.

As shown in FIGS. 3 to 5, the recording head 58 comprises a main pole 60 of a high-saturation-magnetization material, trailing shield 62, and leading shield 64. The main pole 60 produces a recording magnetic field perpendicular to the surfaces of the magnetic disk 12. The recording head 58 constitutes first and second magnetic cores. The first magnetic core forms a first magnetic path mainly comprising the main pole 60 and trailing shield 62. The second magnetic core forms a second magnetic path mainly comprising the main pole 60 and leading shield 64. The recording head 58 comprises first and second coils 70 and 72 wound around the first and second magnetic cores, respectively.

The main pole 60 extends substantially perpendicular to the surfaces of the magnetic disk 12. A distal end portion 60a of the main pole 60 on the disk side is tapered toward the disk surface. The distal end portion 60a of the main pole 60 has, for example, a trapezoidal cross-section, and comprises a trailing end surface of a predetermined width on the trailing end side, leading end surface facing the trailing end surface and narrower than the trailing end surface, and opposite side surfaces. The distal end surface of the main pole 60 is exposed on the ABS 43 of the slider 42. The width of the trailing end surface is substantially equal to the track width of the magnetic disk 12.

The trailing shield 62 of a soft magnetic material is located on the trailing side of the main pole 60 and serves to efficiently close a magnetic path by means of the soft magnetic layer 102 just below the main pole. The trailing shield 62 comprises a first junction 52 and a second junction 65 connected to the main pole 60. A middle portion 50 of the trailing shield 62 is connected to a middle portion of the main pole 60, that is, a position off (and at the back of) the ABS 43, by the first junction 52 of a nonmagnetic material.

The trailing shield 62 is substantially L-shaped and its distal end portion 62a has an elongated rectangular shape. The distal end surface of the trailing shield 62 is exposed on the ABS 43 of the slider 42. A leading end surface 62b of the distal end portion 62a extends transversely relative to the tracks of the magnetic disk 12. The leading end surface 62b is opposed substantially parallel to a trailing end surface 67a of the main pole 60 with write gap WG therebetween.

In the vicinity of the ABS 43, a nonmagnetic conductive layer 65 is disposed between the distal end portion 60a of the main pole 60 and the leading end surface 62b of the trailing shield 62, whereby the main, pole and trailing shield are electrically joined to each other. The nonmagnetic conductive layer 65 and the distal end portion 62a of the trailing shield 62 constitute the second junction that connects the trailing shield 62 to the main pole 60 on the ABS side. The nonmagnetic conductive layer 65 may be either a single-layer structure or a multi-layer structure comprising a plurality of nonmagnetic conductive layers. Copper, silver, gold, aluminum, or Nichrome may be used as the material of the nonmagnetic conductive layer 65.

The nonmagnetic conductive layer 65 may comprise a high-frequency oscillator. In the present embodiment, the nonmagnetic conductive layer 65 comprises a high-frequency oscillator, for example, a spin-torque oscillator 74. The spin-torque oscillator 74 is formed by sequentially laminating an underlayer, spin injection layer (second magnetic layer), interlayer, generating layer (first magnetic layer), and cap layer, from the side of the main pole 60 to the side of the trailing shield 62.

Terminals 90 and 91 are connected to the main pole 60 and trailing shield 62, respectively, and also to a power supply 94. A current circuit is constructed such that current Iop from the power supply 94 can be supplied in series through the main pole 60, nonmagnetic conductive layer 65, and trailing shield 62.

As shown in FIGS. 3 and 4, the recording head 58 comprises the first coil (recording coil) 70, which is located so as to be wound around the magnetic path including the main pole 60 and trailing shield 62 to pass magnetic flux to the main pole while a signal is being written to the magnetic disk 12. The first coil 70 is wound around the first junction 52 between the main pole 60 and trailing shield 62, for example.

As shown in FIGS. 3 to 5, the leading shield 64 of a soft magnetic material is opposed to the main pole 60 on the leading side thereof. The leading shield 64 is substantially U-shaped, and its ABS-side end portion 64a and that end portion (junction at the back of the ABS) 64c which is upwardly separated from the ABS are individually opposed to the main pole 60. Further, the disk-side distal end portion 64a of the leading shield 64 has an elongated rectangular shape. The distal end surface (lower end surface) of the distal end portion 64a is exposed in the ABS 43 of the slider 42. A trailing end surface 64b of the distal end portion 64a extends transversely relative to the tracks of the magnetic disk 12. The trailing end surface 64b is opposed parallel to the leading end surface of the main pole 60 with a gap therebetween. A nonmagnetic body 76 for use as a fourth junction is disposed in the gap. The nonmagnetic body 76 is a protective insulating film, which will be described later.

The end portion (junction) 64c of the leading shield 64 on the back side is joined to the main pole 60 in a position off the magnetic disk 12 (and at the back of the ABS 43) by a third junction 68. The third junction 68 is made of, for example, a soft magnetic material and forms a magnetic circuit in contact with the main pole 60 and leading shield 64. The recording head 58 comprises the second coil 72, which is disposed so as to get wound around the magnetic circuit comprising the main pole 60 and leading shield 64 and applies a magnetic field to the magnetic circuit. The second coil 72 is wound around the third junction 68 between the main pole 60 and leading shield 64, for example. A nonconductive or nonmagnetic body may be inserted into part of the third junction 68.

The second coil 72 is wound opposite to the first coil 70. The number of turns of the second coil 72 is larger than that of the first coil 70. For example, the number of turns of the first coil 70 is two, and that of the second coil 72 is four. Terminals 95 and 96 are connected to the first and second coils 70 and 72, respectively, and a second power supply 98 is connected to the terminals 95 and 96. Further, the second coil 72 is connected in series with the first coil 70. The first and second coils 70 and 72 may be separately controlled for current supply. Currents to be supplied to the coils 70 and 72 are controlled by a control unit of the HDD.

In the recording head 58, as shown in FIGS. 3 and 4, the first junction (nonconductive body) 52 that connects the trailing shield 62 and main pole 60 and the third junction (soft magnetic body) 68 that connects the leading shield 64 and main pole 60 are configured so that A is greater than B (A>B), where A and B are the thicknesses of the junctions 52 and 68, respectively. Thicknesses A and B are junction thicknesses parallel to the ABS 43.

Further, the first junction 52 of the trailing shield 62 and the third junction 68 of the leading shield 64 are configured so that L1 is smaller than L2 (L1<L2), where L1 and L2 are the distances (heights) from the ABS 43 to the lower sides (ABS sides) of the junctions 52 and 68, respectively. In the present embodiment, moreover, the first and third junctions 52 and 68 are offset from each other in the direction perpendicular to the ABS 43 without overlapping parallel to the ABS. Specifically, distance d is provided between the upper end of the first junction 52 and the lower end of the third junction 68.

In the recording head 58 described above, the soft magnetic material that constitutes the main pole 60, trailing shield 62, and leading shield 64 is selected from alloys or compounds containing iron, cobalt, and/or nickel.

As shown in FIGS. 3 and 5, the reproduction head 54 and recording head 58 are entirely covered by the protective insulating film 76 except for those parts which are exposed in the ABS 43 of the slider 42. The protective insulating film 76 defines the external shape of the head section 44.

If the VCM 16 is actuated, according to the HDD with the magnetic heads 33 constructed in this manner, the head actuator 14 pivots, whereupon each magnetic head 33 is moved to and positioned above a desired track of the magnetic disk 12. Further, the head 33 is caused to fly by airflow C that is produced between the disk surface and the ABS 43 as the disk 12 rotates. When the HDD is operating, the ABS 43 of the slider 42 is opposed to the disk surface with a gap therebetween. As shown in FIGS. 2 and 3, the magnetic head 33 flies with the recording head 58 of the head section 44 inclined to be located close to the surface of the disk 12. In this state, recorded data is read from the disk 12 by the reproduction head 54 and data is written by the recording head 58.

In writing data, as shown in FIG. 3, a direct current is supplied from the power supply 94 to the main pole 60, nonmagnetic conductive layer 65 comprising the spin-torque oscillator 74, and trailing shield 62, whereby a high-frequency magnetic field is produced from the spin-torque oscillator 74 and applied to the magnetic recording layer 103 of the magnetic disk 12. Further, an alternating current is supplied from the second power supply 98 to the first and second coils 70 and 72 so that the main pole 60 is excited by the first coil 70, and a perpendicular recording magnetic field is applied from the main pole to the recording layer 103 of the disk 12 just below the main pole. In this way, data is recorded with a desired track width on the magnetic recording layer 103. If the high-frequency magnetic field is superimposed on the recording magnetic field, magnetic recording on the magnetic recording layer 103 with high coercivity and high magnetic anisotropy energy can be achieved. If a current is passed from the main pole 60 to the trailing shield 62, moreover, disturbance of a magnetic domain in the main pole 60 can be eliminated, an efficient magnetic path can be guided, and a magnetic field produced from the distal end of the main pole is intensified.

If a current is then passed through the second coil 72 to excite the leading shield 64 and desired magnetic flux is passed through the closed magnetic path comprising the main pole 60 and leading shield 64, a return magnetic field can be prevented from being concentrated on the position just below the trailing shield 62. Thus, the return magnetic field can also be dispersed into the leading shield 64 by the magnetic flux flowing through the closed magnetic path comprising the leading shield 64, so that intensive return of the magnetic field toward the trailing shield 62 can be suppressed.

In this way, degradation or erasure of data recorded on the recording tracks can be suppressed. Accordingly, degradation or erasure of recorded data can be prevented without reducing the capability of recording on the write tracks. Thus, the track density of the magnetic recording layer of the magnetic disk 12 can be increased, so that the recording density of the HDD can be improved.

FIG. 6 shows a distribution of an effective head magnetic field in a track traveling direction applied from a recording head according to a comparative example to a magnetic recording layer of a magnetic disk. The recording head according to the comparative example comprises a main pole 1, trailing shield 2, high-frequency oscillator (spin-torque oscillator) 100, and first coil 70, and does not comprise either the leading shield 64 or the second coil 72.

To perform high-quality recording on the magnetic recording layer 103 on the magnetic disk 12, the maximum effective magnetic field should be intense. To prevent recorded data from being erased or degraded after recording, however, it is also important to suppress the absolute value of the return magnetic field. In FIG. 6, a full line represents an effective magnetic field distribution of the recording head according to the comparative example with no direct current supplied to the high-frequency oscillator 100, an a broken line represents an effective magnetic field distribution of the recording head with a direct current supplied to the oscillator 100. If a direct current is supplied to the high-frequency oscillator 100, the magnetic field extends just below the main pole 1, so that a satisfactory recording state can be reserved for the magnetic disk 12. At the leading end portion of the trailing shield 2, however, the intensity of a return magnetic field produced opposite to the magnetic field just below the main pole 1 increases. Recorded signals are degraded by this return magnetic field.

In the recording head 58 of the HDD according to the present embodiment, in contrast, the leading shield 64 is disposed on the leading side of the main pole 60, and thickness B of the third junction 68 at the back of the ABS 43 and distance L2 are optimized. In this way, error rate degradation can be avoided and the recording density can be improved even in high-frequency recording.

FIG. 7 shows the absolute value of the return magnetic field obtained when the ratio (B/A) between thickness A of the first junction 52 between the trailing shield 62 and main pole 60 and thickness B of the third junction 68 between the leading shield 64 and main pole 60 is changed, in the recording head 58 according to the present embodiment. The leading shield 64 serves to attenuate the return magnetic field. As seen from FIG. 7, the return magnetic field can be considerably attenuated if B/A becomes smaller than 1. Thus, in the recording head according to the present embodiment, it is evident that the return magnetic field is considerably attenuated as compared with the comparative example if A>B is given, despite substantially the same maximum effective magnetic field.

FIG. 8 shows the relationship between thickness A of the first junction 52 and the maximum effective magnetic field, that is, the maximum value of the head effective magnetic field (head maximum effective magnetic field) obtained when thickness A of the first junction 52 between the trailing shield 62 and main pole 60 is changed. In this example, the head maximum effective magnetic field is drastically degraded when thickness A exceeds 0.3 μm. Preferably, therefore, thickness A of the first junction 52 should be restricted to 0.3 μm or less.

Figure 9:
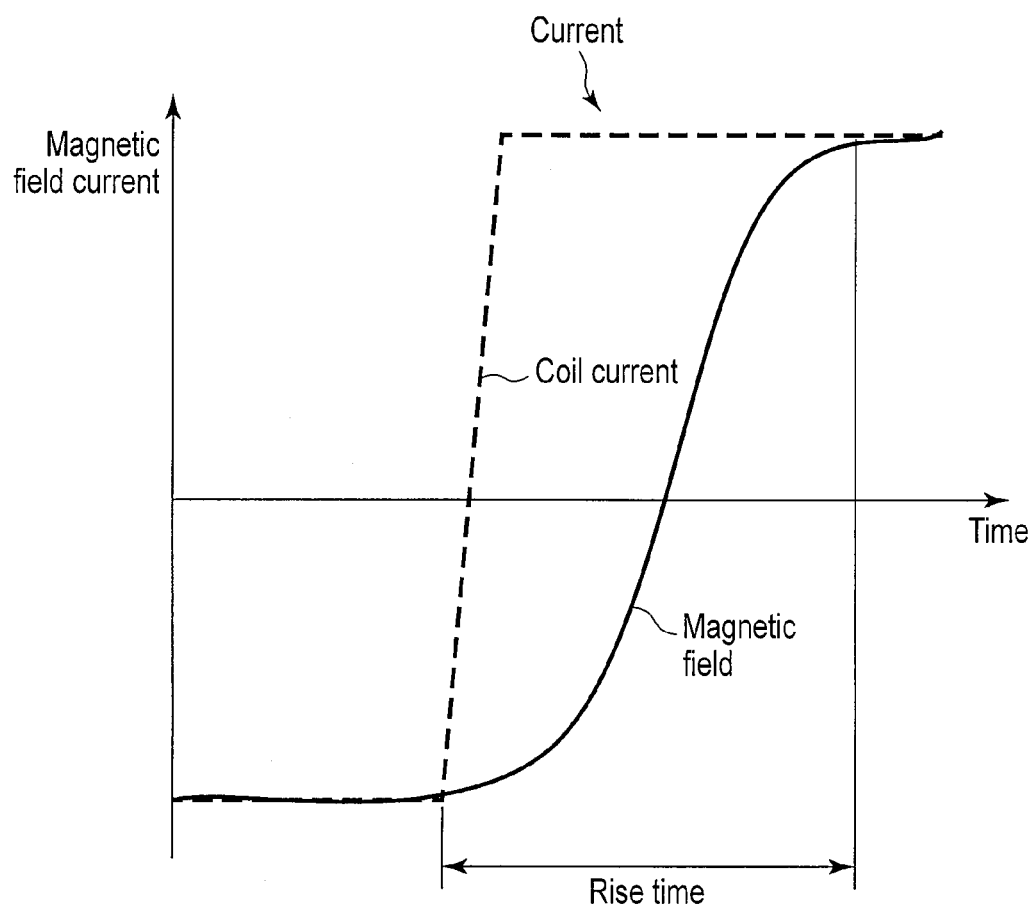
FIG. 9 is a diagram showing temporal change (broken and dash-dotted lines) in current obtained when current polarity is reversed and that (full line) in the head maximum effective magnetic field just below the main pole, in the recording head according to the embodiment.

FIG. 9 shows temporal change (broken line) of coil current obtained when current polarity is reversed as an alternating current is supplied to the first and second coils 70 and 72 and that (full line) of the head maximum effective magnetic field just below the main pole 60.

The magnetic field rises more slowly than the current being reversed in polarity. The time elapsed from the start of the current polarity reversal until the polarity reversal of the magnetic field is maximized is defined as the rise time. If the rise time is long, the polarity reversal of the magnetic field cannot reach its maximum value in high-transfer-rate (high-frequency) recording, so that the recording capability of the recording head is reduced and the record transition quality of the magnetic recording layer is degraded.

FIG. 10 shows the change of the rise time obtained when distance L1 from the ABS 43 to the lower side of the first junction 52 is changed. The rise time can be shortened by reducing distance L1. Thus, the error rate can be expected to be improved by reducing distance L1 in high-transfer-rate recording.

FIG. 11 shows the magnitude of the return magnetic field obtained when the ratio between the numbers of turns of the first and second coils 70 and 72 (leading-side second coil turn number/trailing-side first coil turn number) is changed. As seen from FIG. 11, the return magnetic field can be attenuated by increasing the coil turn ratio. Thus, the return magnetic field can be attenuated by making the number of turns of the second coil 72 larger than that of the first coil 70.

Figure 12:
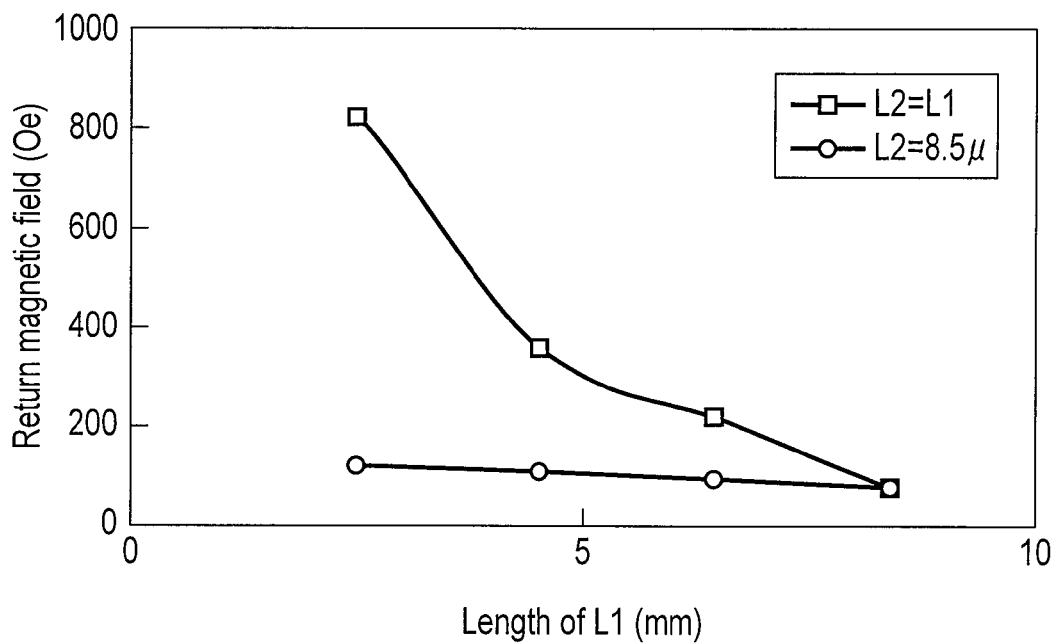
FIG. 12 is a diagram showing the magnitude of the return magnetic field obtained when the size (length) of distance L1 for the first junction is changed, in the recording head according to the embodiment.

FIG. 12 shows the magnitude of the return magnetic field obtained when the size (length) of distance L1 related to the first junction 52 is changed. If L1 and L2 are equal, that is, if the respective lower sides of the first and third junctions 52 and 68 are flush with each other, L1 and L2 are simultaneously reduced, so that the return magnetic field is enhanced. Specifically, if L1 is reduced for high-transfer-rate (high-frequency) recording, L2 is also reduced, so that it is difficult to increase the number of turns of the second coil 72 on the side of the leading shield 64. Thus, the return magnetic field is enhanced, so that the error rate is inevitably degraded.

As in the present embodiment, therefore, the rise time can be reduced (or improved) while keeping the return magnetic field suppressed, by fixing distance L2 related to the third junction 68 to, for example, 8.5 µm to secure a space for a predetermined number of turns for the second coil 72 and reducing distance L1 only.

Figure 13:
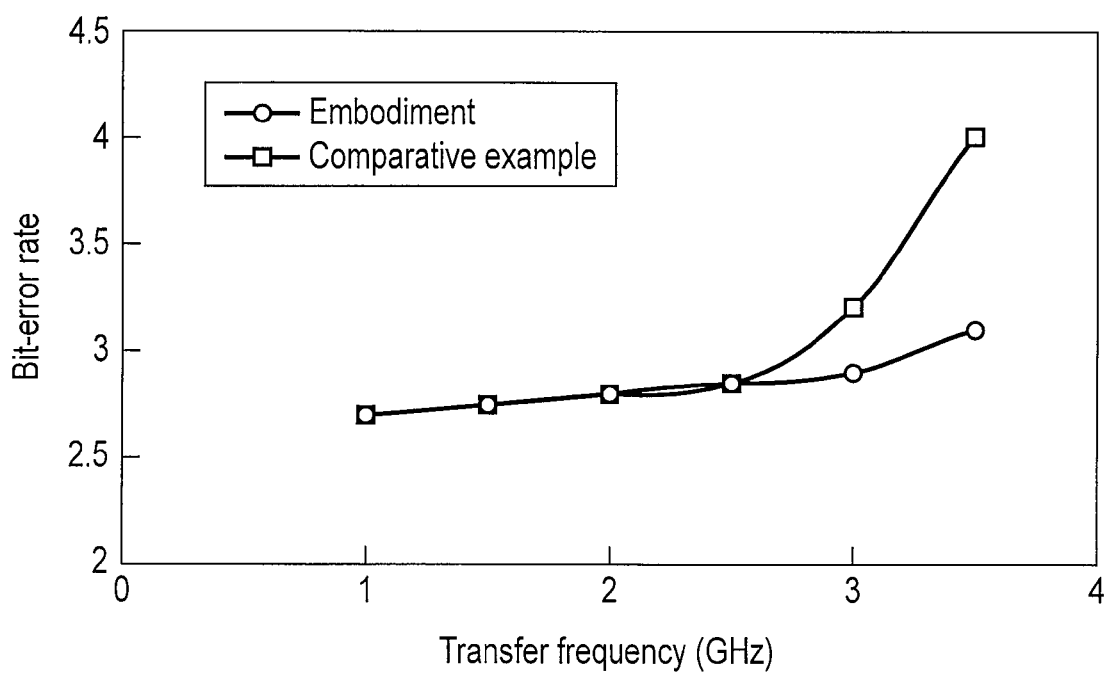
FIG. 13 is a diagram comparatively showing the relationship between the transfer frequency and bit-error rate for the recording heads according to the embodiment and comparative example.

FIG. 13 shows the effect of the present embodiment in comparison with the comparative example. Since the rise time is not improved in the comparative example, the bit-error rate is degraded in high-transfer-rate recording, as seen from FIG. 13. According to the present embodiment, however, the rise time can be reduced while keeping the return magnetic field suppressed, so that the bit-error rate can be improved in high-transfer-rate recording, as illustrated.

Thus, according to the magnetic recording head of the HDD of the present embodiment, the leading core is disposed and the second coil is also wound around the leading-side magnetic core, in the recording head of the pole-energization type configured to produce a high recording magnetic field. By doing this, the return magnetic field concentrated on the trailing shield can be suppressed, degradation of recorded signals can be prevented, and the recording density of the magnetic disk drive can be improved. Further, the thickness of the first junction at the back of the ABS and the distance from the ABS are optimized. In this way, error rate degradation can be avoided and the recording density can be improved even in high-frequency recording using the magnetic recording head with the high-frequency oscillator. Thus, there may be provided a magnetic recording head, free from error rate degradation and capable of being improved in recording density, and a disk device with the same.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes, sizes, etc., of elements that constitute the head section may be changed as required. In the magnetic disk drive, moreover, the numbers of the magnetic disks and magnetic heads can be increased as required, and various disk sizes can be selected.

What is claimed is:

1. A magnetic recording head comprising:
   a disk-facing surface configured to face a recording medium;
   a main pole configured to produce a recording magnetic field in a direction perpendicular to a recording layer of the recording medium;
   a trailing shield which is located on the trailing side of the main pole with a write gap therebetween and forms a first magnetic core in cooperation with the main pole;
   a first junction of a nonmagnetic material which connects the trailing shield and the main pole in a position off the disk-facing surface;
   a second junction which comprises a nonmagnetic conductive layer comprising a high-frequency oscillator and connects the trailing shield and an end portion of the main pole on side of the disk-facing surface;
   a first coil wound around the first magnetic core;
   a leading shield which is located on the leading side of the main pole, comprises a distal end portion opposed to the end portion of the main pole on side of the disk-facing surface with a nonmagnetic material therebetween and a junction connected to the main pole in a position off the disk-facing surface with a third junction of a magnetic material therebetween, and forms a second magnetic core in cooperation with the main pole;
   a second coil wound around the second magnetic core; and
   a connecting terminal configured to pass a current in series through the main pole, the nonmagnetic conductive layer, and the trailing shield, wherein
   a thickness of the third junction in a direction parallel to the disk-facing surface is smaller than that of the first junction in the same direction.

2. The magnetic recording head of claim 1, wherein a distance from the disk-facing surface to the third junction is greater than a distance from the disk-facing surface to the first junction.

3. The magnetic recording head of claim 2, wherein the first and third junctions are spaced apart from each other in a direction perpendicular to the disk-facing surface.

4. The magnetic recording head of claim 3, wherein the number of turns of the second coil is larger than that of the first coil.

5. The magnetic recording head of claim 1, wherein the first and third junctions are spaced apart from each other in a direction perpendicular to the disk-facing surface.

6. The magnetic recording head of claim 1, wherein the number of turns of the second coil is larger than that of the first coil.

7. The magnetic recording head of claim 2, wherein the number of turns of the second coil is larger than that of the first coil.

8. A disk drive comprising:
   a recording medium comprising a magnetic recording layer having a magnetic anisotropy in a direction perpendicular to a surface of the medium;
   a drive unit configured to rotate the recording medium; and
   a magnetic head comprising a magnetic recording head and configured to record data on or read data from the recording medium,
   the magnetic recording head comprising:
   a disk-facing surface configured to face the recording medium;

a main pole configured to produce a recording magnetic field in a direction perpendicular to a recording layer of the recording medium;

a trailing shield which is located on the trailing side of the main pole with a write gap therebetween and forms a first magnetic core in cooperation with the main pole;

a first junction of a nonmagnetic material which connects the trailing shield and the main pole in a position off the disk-facing surface;

a second junction which comprises a nonmagnetic conductive layer comprising a high-frequency oscillator and connects the trailing shield and an end portion of the main pole on side of the disk-facing surface;

a first coil wound around the first magnetic core;

a leading shield which is located on the leading side of the main pole, comprises a distal end portion opposed to the end portion of the main pole on side of the disk-facing surface with a nonmagnetic material therebetween and a junction connected to the main pole in a position off the disk-facing surface with a third junction of a magnetic material therebetween and forms a second magnetic core in cooperation with the main pole;

a second coil wound around the second magnetic core; and a connecting terminal configured to pass a current in series through the main pole, the nonmagnetic conductive layer and the trailing shield, wherein a thickness of the third junction in a direction parallel to the disk-facing surface is smaller than that of the first junction in the same direction.

9. The disk drive of claim 8, wherein a distance from the disk-facing surface to the third junction is greater than a distance from the disk-facing surface to the first junction.

10. The disk drive of claim 9, wherein the first and third junctions are spaced apart from each other in a direction perpendicular to the disk-facing surface.

11. The disk drive of claim 10, wherein the number of turns of the second coil is larger than that of the first coil.

12. The disk drive of claim 8, wherein the first and third junctions are spaced apart from each other in a direction perpendicular to the disk-facing surface.

13. The disk drive of claim 8, wherein the number of turns of the second coil is larger than that of the first coil.

14. The disk drive of claim 9, wherein the number of turns of the second coil is larger than that of the first coil.

* * * * *